US011055792B2

(12) United States Patent
Wang et al.

(10) Patent No.: US 11,055,792 B2
(45) Date of Patent: Jul. 6, 2021

(54) BLOCKCHAIN-BASED SERVICE SOURCE TRACING METHOD, APPARATUS, AND ELECTRONIC DEVICE

(71) Applicant: Advanced New Technologies Co., Ltd., Grand Cayman (KY)

(72) Inventors: Xu Wang, Hangzhou (CN); Zhaolin Feng, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/803,955

(22) Filed: Feb. 27, 2020

(65) Prior Publication Data
US 2020/0234383 A1 Jul. 23, 2020

Related U.S. Application Data

(63) Continuation of application No. PCT/CN2020/070606, filed on Jan. 7, 2020.

(30) Foreign Application Priority Data
Apr. 29, 2019 (CN) .......................... 201910356825.X

(51) Int. Cl.
*G06Q 40/00* (2012.01)
*G06F 16/27* (2019.01)
(Continued)

(52) U.S. Cl.
CPC ......... *G06Q 40/12* (2013.12); *G06F 16/2379* (2019.01); *G06F 16/27* (2019.01);
(Continued)

(58) Field of Classification Search
CPC .. G06Q 40/12; G06Q 30/04; G06Q 20/38215; G06Q 10/10; G06Q 40/02; G06F 16/27; G06F 16/2379
See application file for complete search history.

(56) References Cited

U.S. PATENT DOCUMENTS 10,469,605 B1 * 11/2019 Batey .................. H04L 67/1097
10,657,566 B2 * 5/2020 Manning ............ G06Q 30/0277
(Continued)

FOREIGN PATENT DOCUMENTS

| CN | 107391735 | 11/2017 |
| CN | 107657553 | 2/2018 |

(Continued)

OTHER PUBLICATIONS

Dib et al. "Consortium Blockchains: Overview, Applications and Challenges". International Journal on Advances in Telecommunications, vol. 11 No. 1 & 2, year 2018, http://www.iariajournals.org/telecommunications/ (Year: 2018).*

(Continued)

*Primary Examiner* — Nathan A Mitchell
(74) *Attorney, Agent, or Firm* — Fish & Richardson P.C.

(57) ABSTRACT

Computer-implemented methods, non-transitory, computer-readable media, and computer-implemented systems for blockchain-based service source tracing are provided. A blockchain stores service certificates of multiple service dimensions which constitute multiple service certificate linked lists. A service system maintains a mapping relationship between a last node of each service certificate linked list and a service index of a service dimension that each service certificate linked list belongs to. In response to a client-initiated service source tracing request for a target service dimension that includes a service index of the target service dimension, the mapping relationship is queried to determine the last node corresponding to the service index of the target service dimension. A service certificate of the target service dimension stored on the blockchain is queried based on a linked list pointer recorded in the last node. The identified service certificate is returned to the client.

20 Claims, 5 Drawing Sheets

(51) Int. Cl.
   *G06F 16/23* (2019.01)
   *G06Q 40/02* (2012.01)
   *G06Q 10/10* (2012.01)
   *G06Q 30/04* (2012.01)
   *G06Q 20/38* (2012.01)

(52) U.S. Cl.
   CPC ....... *G06Q 10/10* (2013.01); *G06Q 20/38215* (2013.01); *G06Q 30/04* (2013.01); *G06Q 40/02* (2013.01)

(56) References Cited

U.S. PATENT DOCUMENTS

| | | | | |
|---|---|---|---|---|
| 2001/0009002 | A1* | 7/2001 | Logan | G06Q 20/102 705/34 |
| 2007/0145115 | A1 | 6/2007 | Savage et al. | |
| 2017/0357970 | A1* | 12/2017 | Muftic | G06Q 20/26 |
| 2018/0060836 | A1 | 3/2018 | Castagna | |
| 2018/0253464 | A1* | 9/2018 | Kohli | H04L 9/3247 |
| 2019/0080284 | A1* | 3/2019 | Kim | G06Q 10/0833 |
| 2020/0021429 | A1* | 1/2020 | Harrington | H04L 9/0838 |
| 2020/0037158 | A1* | 1/2020 | Soundararajan | H04L 9/3239 |
| 2020/0092083 | A1* | 3/2020 | Keskar | G06N 20/00 |
| 2020/0104297 | A1* | 4/2020 | Keskar | H04L 9/0637 |
| 2020/0104836 | A1* | 4/2020 | Coburn | G06F 16/2255 |
| 2020/0126321 | A1* | 4/2020 | Swearingen | G06F 21/602 |
| 2020/0155944 | A1* | 5/2020 | Witchey | A63F 13/70 |

FOREIGN PATENT DOCUMENTS

| | | |
|---|---|---|
| CN | 108846010 | 11/2018 |
| CN | 109559231 | 4/2019 |
| CN | 109583917 | 4/2019 |
| CN | 110162527 | 8/2019 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

International Search Report and Written Opinion in PCT Appln. No. PCT/CN2020/070606, dated Apr. 8, 2020, 9 pages (full machine translation).

* cited by examiner

BLOCKCHAIN-BASED SERVICE SOURCE TRACING METHOD, APPARATUS, AND ELECTRONIC DEVICE

CROSS-REFERENCE TO RELATED APPLICATIONS

This application is a continuation of PCT Application No. PCT/CN2020/070606, filed on Jan. 7, 2020, which claims priority to Chinese Patent Application No. 201910356825.X, filed on Apr. 29, 2019, and each application is hereby incorporated by reference in its entirety.

TECHNICAL FIELD

One or more implementations of the present specification relate to the field of blockchain technologies, and in particular, to blockchain-based service source tracing methods, apparatuses, and electronic devices.

BACKGROUND

The blockchain technology, also referred to as a distributed ledger technology, is an emerging technology in which several computing devices jointly participate in "accounting" and jointly maintain a complete distributed database. Due to its features of decentralization, openness and transparency, participation in database recorded by each computing device, and fast data synchronization between computing devices, the blockchain technology has been widely used in many fields.

SUMMARY

In view of the previous description, the present specification provides a blockchain-based service source tracing method and apparatus, and an electronic device, to implement service source tracing for a target service dimension.

The present specification is implemented by using the following technical solutions:

According to a first aspect of the present specification, a blockchain-based service source tracing method is provided, where the method is applied to a service system; the blockchain stores service certificates of multiple service dimensions; the service certificates of the multiple service dimensions form multiple service certificate linked lists (linked lists of the service certificates); and the service system maintains a mapping relationship between the last node of each service certificate linked list and a service index of a service dimension that each service certificate linked list belongs to; and the method includes the following: in response to a client-initiated service source tracing request for any target service dimension, where the service source tracing request includes a service index of the target service dimension, querying the mapping relationship to determine the last node corresponding to the service index of the target service dimension; and querying a service certificate of the target service dimension stored on the blockchain based on a linked list pointer recorded in the last node, and returning the identified service certificate to the client to complete service source tracing for the target service dimension.

Optionally, the mapping relationship is updated by the following method: monitoring the service certificate of the target service dimension stored on the blockchain; when it is detected that the blockchain stores a target service certificate of a newly added node in a target service certificate linked list corresponding to the target service dimension, updating the service index of the target service dimension from an unlocked state to a locked state, and updating the last node of the maintained target service certificate linked list into the target service certificate; and after the last node of the maintained target service certificate linked list is updated into the target service certificate, updating the service certificate of the target service dimension from a locked state to an unlocked state.

Optionally, the service certificate includes multiple pointer fields, and the pointer fields correspond to different service dimensions respectively; and the pointer fields are used to fill linked list pointers, and the service certificates of the multiple service dimensions stored on the blockchain form multiple service certificate linked lists based on linked list pointers in the pointer fields of the service certificates.

Optionally, the linked list pointer is a hash pointer.

Optionally, the service certificate linked list is a one-way linked list.

Optionally, the service certificate linked list includes the following: a first-type service certificate linked list including service certificates of the same service at different service stages stored on the blockchain in an order of service stages; or a second-type service certificate linked list including service certificates of multiple services stored on the blockchain in an order of service occurrences.

Optionally, the first-type service certificate linked list is a linked list including a billing certificate, a payment certificate, a write-off certificate, and a settlement certificate of the same payment agency collection service in an order of service stages of the payment agency collection service.

Optionally, the second-type service certificate linked list can include any one of the following: multiple billing certificates in an order of billing occurrences; multiple payment certificates in an order of payment occurrences; multiple write-off certificates in an order of write-off occurrences; or multiple settlement certificates in an order of settlement occurrences.

Optionally, the blockchain includes a consortium blockchain including a payment institution and a payment platform; the service includes a payment agency collection service provided by the payment platform for the payment institution; and the service certificates include a payment bill, a payment certificate, a write-off certificate, a settlement certificate, and a refund certificate.

According to a second aspect of the present specification, a blockchain-based service source tracing apparatus is provided, where the apparatus is applied to a service system; the blockchain stores service certificates of multiple service dimensions; the service certificates of the multiple service dimensions form multiple service certificate linked lists; and the service system maintains a mapping relationship between the last node of each service certificate linked list and a service index of a service dimension that each service certificate linked list belongs to; and the apparatus includes the following: a responding unit, configured to respond to a client-initiated service source tracing request for any target service dimension, where the service source tracing request includes a service index of the target service dimension; a determining unit, configured to query the mapping relationship to determine the last node corresponding to the service index of the target service dimension; and a source tracing unit, configured to query a service certificate of the target service dimension stored on the blockchain based on a linked list pointer recorded in the last node, and return the identified service certificate to the client to complete service source tracing for the target service dimension.

Optionally, the apparatus further includes the following: a monitoring unit, configured to monitor the service certificate of the target service dimension stored on the blockchain; a locking update unit, configured to: when it is detected that the blockchain stores a target service certificate of a newly added node in a target service certificate linked list corresponding to the target service dimension, update the service index of the target service dimension from an unlocked state to a locked state, and update the last node of the maintained target service certificate linked list into the target service certificate; and an unlocking unit, configured to: after the last node of the maintained target service certificate linked list is updated into the target service certificate, update the service certificate of the target service dimension from a locked state to an unlocked state.

Optionally, the service certificate includes multiple pointer fields, and the pointer fields correspond to different service dimensions respectively; and the pointer fields are used to fill linked list pointers, and the service certificates of the multiple service dimensions stored on the blockchain form multiple service certificate linked lists based on linked list pointers in the pointer fields of the service certificates.

Optionally, the linked list pointer is a hash pointer.

Optionally, the service certificate linked list is a one-way linked list.

Optionally, the service certificate linked list includes the following: a first-type service certificate linked list including service certificates of the same service at different service stages stored on the blockchain in an order of service stages; or a second-type service certificate linked list including service certificates of multiple services stored on the blockchain in an order of service occurrences.

Optionally, the first-type service certificate linked list is a linked list including a billing certificate, a payment certificate, a write-off certificate, and a settlement certificate of the same payment agency collection service in an order of service stages of the payment agency collection service.

Optionally, the second-type service certificate linked list includes any one of the following: multiple billing certificates in an order of billing occurrences; multiple payment certificates in an order of payment occurrences; multiple write-off certificates in an order of write-off occurrences; or multiple settlement certificates in an order of settlement occurrences.

Optionally, the blockchain includes a consortium blockchain including a payment institution and a payment platform; the service includes a payment agency collection service provided by the payment platform for the payment institution; and the service certificates include a payment bill, a payment certificate, a write-off certificate, a settlement certificate, and a refund certificate.

According to a third aspect of the present specification, an electronic device is provided, including the following: a processor; and a memory, configured to store a machine executable instruction, where by reading and executing a machine executable instruction that is stored in the memory and corresponds to control logic of blockchain-based service source tracing, the processor is enabled to perform the following operations: in response to a client-initiated service source tracing request for any target service dimension, where the service source tracing request includes a service index of the target service dimension, querying the maintained mapping relationship between the last node of each service certificate linked list and the service index of the service dimension that each service certificate linked list belongs to, to determine the last node corresponding to the service index of the target service dimension; and querying a service certificate of the target service dimension stored on the blockchain based on a linked list pointer recorded in the last node, and returning the identified service certificate to the client to complete service source tracing for the target service dimension, where the blockchain stores service certificates of multiple service dimensions, and the service certificates of the multiple service dimensions form multiple service certificate linked lists.

It can be seen from the previous description that, on the one hand, in the present specification, the blockchain is used to store service certificates of multiple service dimensions, so that accuracy of service source tracing can be improved by using the tamper-resistance feature of the data whose certificate has been stored on the blockchain. In addition, the service certificates can be described based on multiple service dimensions, so that source tracing services of multiple service dimensions can be provided for users, thereby effectively improving the richness of the source tracing services and satisfying the diverse demands of users.

On the other hand, service certificates of multiple service dimensions stored on the blockchain form multiple service certificate linked lists, and the service system locally maintains the mapping relationship between the last node of each service certificate linked list and the service index of each service dimension, so that the service system can identify, based on the last node, a service certificate corresponding to each node of the service certificate linked list that includes the last node, thereby implementing service source tracing.

DESCRIPTION OF IMPLEMENTATIONS

Figure 1:
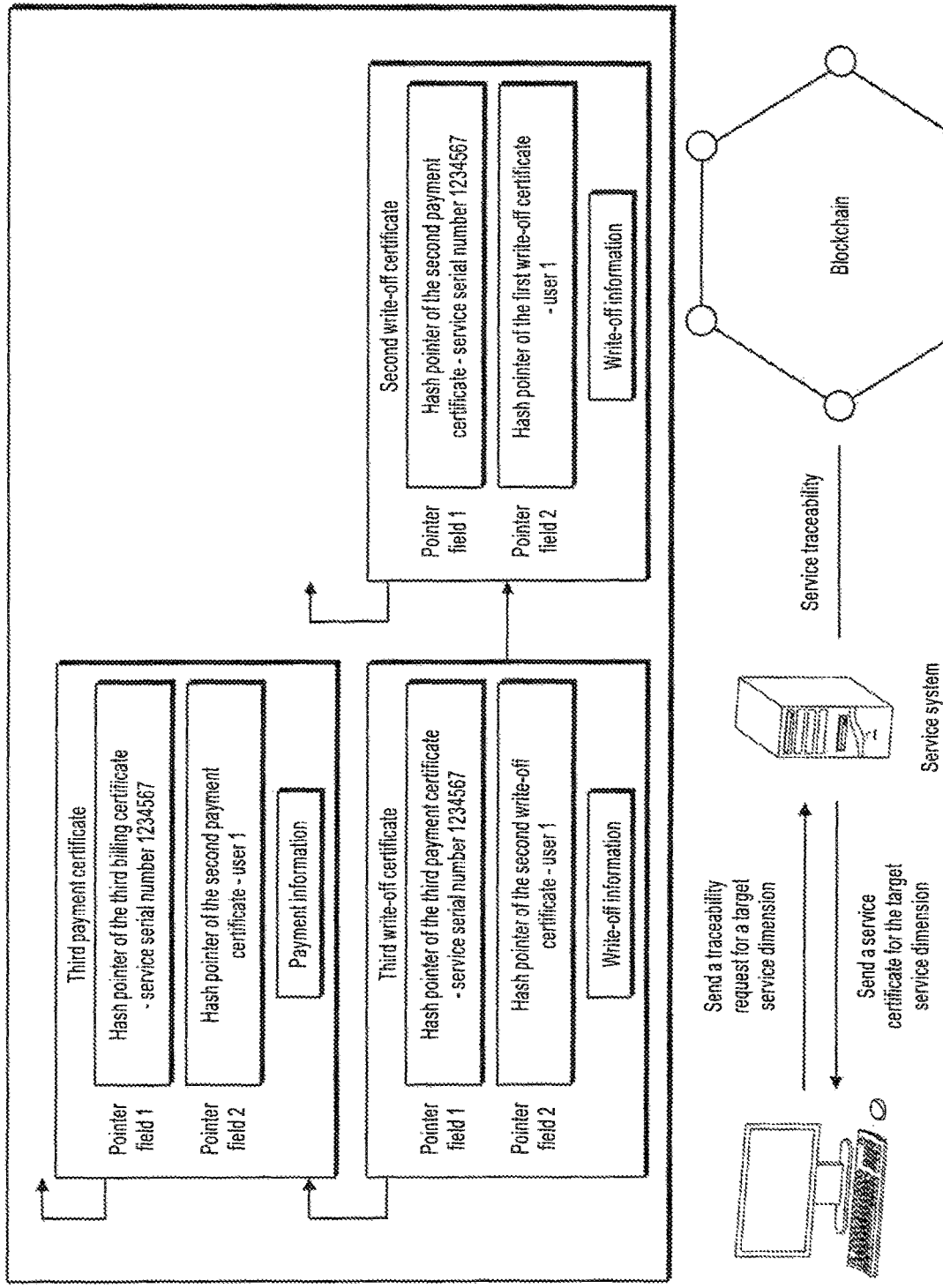
FIG. 1 is a schematic diagram illustrating a blockchain-based service source tracing system, according to an example implementation of the present specification.

Example implementations are described in detail here, and examples of the example implementations are presented in the accompanying drawings. When the following description relates to the accompanying drawings, unless specified otherwise, same numbers in different accompanying drawings represent same or similar elements. Implementations described in the following example implementations do not represent all implementations consistent with the present specification. On the contrary, the implementations are only examples of apparatuses and methods that are described in the appended claims in detail and consistent with some aspects of the present specification.

The terms used in the present specification are merely for illustrating specific implementations, and are not intended to limit the present specification. The terms "a" and "the" of singular forms used in the present specification and the appended claims are also intended to include plural forms, unless otherwise specified in the context clearly. It should be further understood that the term "and/or" used in the present specification indicates and includes any or all possible combinations of one or more associated listed items.

It should be understood that although terms "first", "second", "third", etc. may be used in the present specification to describe various types of information, the information should not be limited by these terms. These terms are only used to differentiate between information of the same type. For example, without departing from the scope of the present specification, first information can also be referred to as second information, and similarly, the second information can also be referred to as the first information. Depending on the context, for example, the word "if" used here can be explained as "while", "when", or "in response to determining".

The present specification is intended to provide a technical solution in which service certificates of multiple service dimensions stored on the blockchain are used to complete service source tracing for any service dimension.

On the one hand, in the present specification, the blockchain is used to store service certificates of multiple service dimensions, so that accuracy of service source tracing can be improved by using the tamper-resistance feature of the data whose certificate has been stored on the blockchain. In addition, the service certificates can be described based on multiple service dimensions, so that source tracing services of multiple service dimensions can be provided for users, thereby effectively improving the richness of the source tracing services and satisfying the diverse demands of users.

On the other hand, service certificates of multiple service dimensions stored on the blockchain form multiple service certificate linked lists, and the service system locally maintains the mapping relationship between the last node of each service certificate linked list and the service index of each service dimension, so that after receiving the service source tracing request for the target service dimension sent by the client, the service system can determine the last node corresponding to a target service index in the mapping relationship based on the target service index in the service source tracing request, and identify, by using a linked list pointer in the last node, a service certificate corresponding to each node in a service certificate linked list that the last node belongs to, so as to complete the service source tracing for the target service dimension.

FIG. 1 is a schematic diagram illustrating a blockchain-based service source tracing system, according to an example implementation of the present specification.

The source tracing system of the blockchain includes a blockchain, a service system, and a client.

The previously described service system is a system that participates in service execution and provides a service source tracing service for a user.

For example, in a payment agency collection service, the user can complete payment to a payment institution by using a payment platform. The previously described service system can be a payment platform in the payment agency collection service or a payment institution in the payment agency collection service. The previous description of the service system is merely an example, and is not limited.

The previously described payment institution is an institution that can issue a bill. For example, when the payment agency collection service is a water fee or electricity fee payment service, the payment institution can be a payee institution for water fee or electricity fee. The user can pay water fee, electricity fee, etc. to the payee institution by using the payment platform. For another example, when the payment agency collection service is a credit card repayment service, the payment institution can be a banking institution, and the user can complete the credit card repayment service to the banking institution by using the payment platform.

The previously described payment platform is a third-party platform that can perform a payment agency collection function. For example, the payment platform can be ALIPAY, JD Finance, WeChat, or a similar product having a payment agency collection function of a bank.

The previously described client is a client connected to the previous service system. The user can initiate service source tracing by using the client, and the service system can return a service source tracing result to the client. The client is not limited here.

Blockchains are generally classified into three types: public blockchain, private blockchain, and consortium blockchain. In addition, there are multiple types of combinations, such as private blockchain+consortium blockchain, consortium blockchain+public blockchain, etc. The public blockchain has the highest degree of decentralization. The public blockchain is represented by Bitcoin and Ethereum. Participants joining the public blockchain can read data records on the blockchain, participate in transactions, and contend for the accounting right in new blocks.

Furthermore, participants (namely, nodes) can join or exit the network freely and perform related operations. On the contrary, in the private blockchain, write permissions of the network are controlled by a certain organization or institution, and the data read permissions are specified by the organization. In short, the private blockchain can be a weakly-centralized system. There are a few participating nodes that are strictly restricted. Such type of blockchain is more suitable for use within a particular institution.

The consortium blockchain is a blockchain between the public blockchain and the private blockchain, and can implement "partial decentralization". Each node in the consortium blockchain usually has its corresponding physical institution or organization. Participants join the network through authorization and form a stakeholder consortium to jointly maintain blockchain operation.

The blockchain described in the present specification can include any type of blockchain network. In practice, any one of the public blockchain, the private blockchain, or the consortium blockchain can be used.

For example, in a payment agency collection scenario, the blockchain can be a consortium blockchain including the previous payment institution and the previous payment platform. The previous description is merely an example, and is not limited.

Concepts used in the present specification are described before describing a blockchain-based service source tracing method provided in the present specification.

(1) Service Dimension and Service Index

The service dimension is a perspective for describing a service.

For example, in the payment agency collection scenario, a payment agency collection service includes a service serial number, a payment user, a payment institution, etc. The payment agency collection service can be described from the perspective of the service serial number, from the perspective of the payment user, or from the perspective of the payment institution. The service serial number, the payment user, and the payment institution are service dimensions of the payment agency collection service.

Service index corresponds to service dimension. One service dimension can include multiple service indices.

For example, the service dimension is a service serial number, and the service index is a specific serial number. For example, the service index is service serial number 1234567, and the service index is serial number 1345678.

For another example, the service dimension is a payment user, and the service index is a specific payment user identifier. For example, the service index is a user ID of a payment user Wang.

The previous description of the service dimension and the service index is merely an example, and is not limited.

(2) Service Certificate

The service certificate refers to certificate data generated at each stage of executing each service.

For example, after a user purchases some services or products, the payment institution generates a billing certificate for the user. The user needs to pay for these services or products by using the payment platform.

After receiving funds paid by the user, the payment platform can deposit the funds into an intermediate account and generate a payment certificate. The payment platform instructs the payment institution to perform write-off, and the payment institution generates a write-off certificate. During settlement, the payment platform will settle the funds paid by each user for the payment institution to the payment institution, and generate a settlement certificate. If the transaction fails and refund occurs, the payment platform can return the funds paid by the user to the user, and generate a refund certificate.

The previously described billing certificate, payment certificate, write-off certificate, settlement certificate, and refund certificate are all service certificates. The previous description of the service certificate is merely an example, and is not limited.

In the implementation of the present specification, after generating a service certificate, a service executor can publish the certificate to the blockchain for certificate storage where data published to the blockchain is stored in the blockchain, creating an immutable record to be verified later.

The payment agency collection scenario is still used as an example for description. After the user purchases some services or products, the payment institution will generate a billing certificate for the user and publish the billing certificate to the blockchain for certificate storage.

After detecting the billing certificate stored on the blockchain, the payment platform can initiate a payment service to the user. After the user completes the payment, the payment platform can generate a payment certificate and publish the payment certificate to the blockchain for certificate storage.

After detecting the payment certificate stored on the blockchain, the payment institution can perform write-off processing, generate a write-off certificate, and publish the write-off certificate to the blockchain for certificate storage.

After detecting the write-off certificate stored on the blockchain, the payment platform can obtain a write-off result of the payment institution.

The payment platform can complete settlement based on the payment certificate and the write-off certificate that are stored on the blockchain, and publish a settlement certificate to the blockchain for certificate storage.

(3) Service Certificate Linked List

In the implementation of the present specification, a service certificate stored on the blockchain in the present specification includes multiple pointer fields. Each pointer field corresponds to services of multiple dimensions.

For each service dimension, the pointer field corresponding to the service dimension is filled with a linked list pointer pointing to a certificate of a previous service or a service certificate of a previous service stage. The service certificate corresponding to the service dimension forms a service certificate linked list corresponding to the service dimension by using the linked list pointer filled in the pointer field of the service certificate.

It can be seen from the previous description that, the service certificate stored on the blockchain forms each service certificate linked list corresponding to each service dimension by using the linked list pointers in the pointer fields corresponding to different service dimensions stored in the service certificate.

The service certificate linked list in the present specification can include the following: a first-type service certificate linked list including service certificates of the same service at different service stages stored on the blockchain in an order of service stages; or a second-type service certificate linked list including service certificates of multiple services stored on the blockchain in an order of service occurrences.

For example, in the payment agency collection scenario, the first-type service certificate linked list can be a linked list including the billing certificate, the payment certificate, the write-off certificate, and the settlement certificate that are stored on the blockchain in an order of service stages of the payment agency collection service.

For example, in the payment agency collection scenario, the second-type service certificate linked list can include multiple payment bill certificates in an order of billing. The second-type service certificate linked list can also include multiple payment certificates in an order of payment occurrences. The second-type service certificate linked list can also include multiple write-off certificates in an order of write-off occurrences. The second-type service certificate linked list can also include multiple settlement certificates in an order of settlement occurrences.

Figure 2:
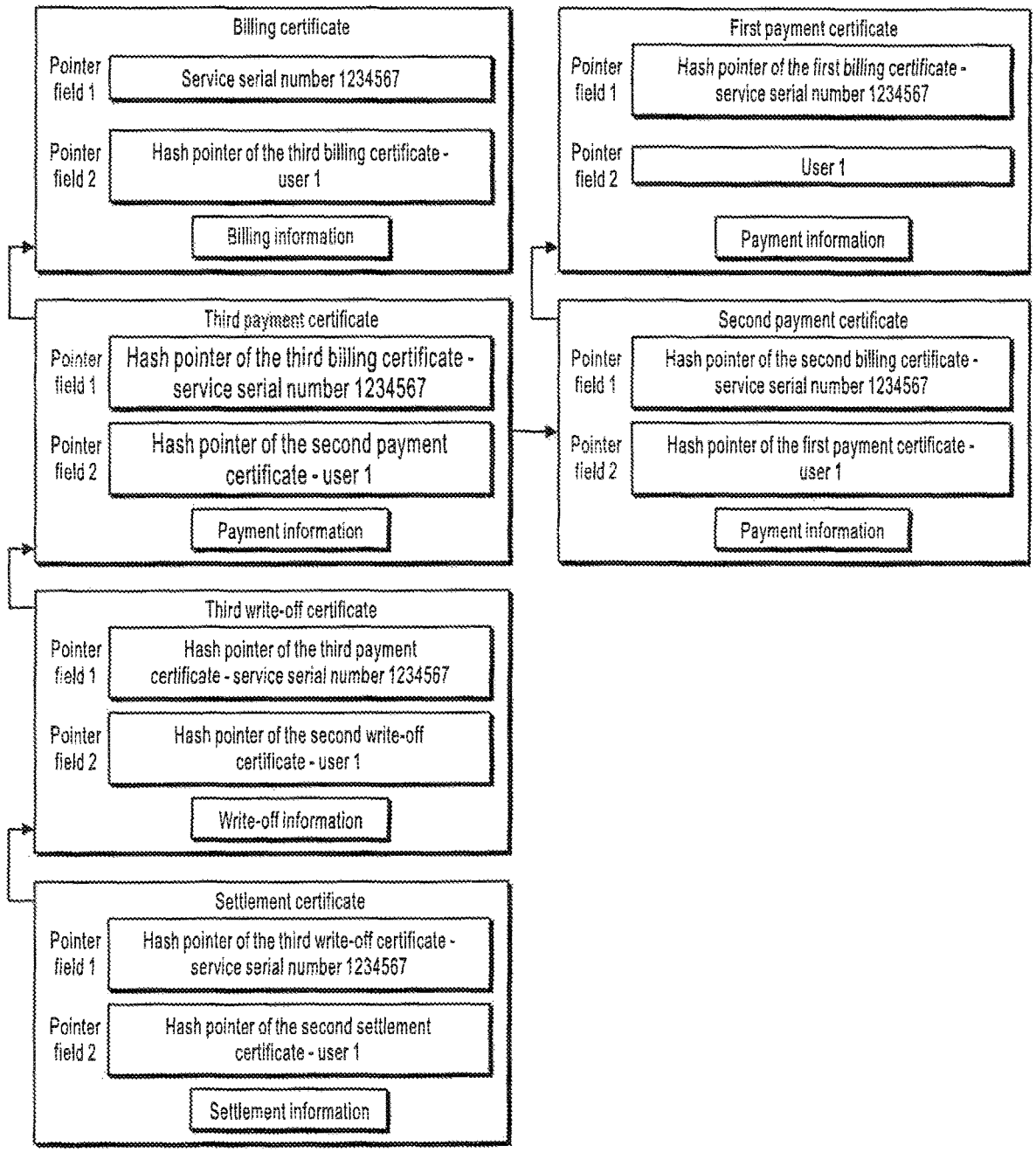
FIG. 2 is a schematic diagram illustrating a service certificate, according to an example implementation of the present specification.

For example, as shown in FIG. 2, assume that the service certificate is the third payment certificate.

For example, the third payment certificate includes two pointer fields: pointer field 1 and pointer field 2. Pointer field 1 and pointer field 2 respectively correspond to two service dimensions: a service serial number and a payment user.

Assume that the service serial number of the third payment certificate is 1234567, and the payment user corresponding to the third payment certificate is user 1.

Pointer field 1 of the third payment certificate is filled with a service certificate at a previous stage of the service with serial number 1234567, that is, is filled with a linked list pointer of the third billing certificate with serial number 1234567. Certainly, the blockchain further stores the third write-off certificate and the third settlement certificate of the service with serial number 1234567. The specified field corresponding to the serial number dimension in the third write-off certificate is filled with the linked list pointer of the third payment certificate. The specified field corresponding to the serial number dimension in the third settlement certificate is filled with the linked list pointer of the third write-off certificate. The service certificates at various stages of the service with serial number 1234567 form a service certificate linked list 1 corresponding to the serial number service dimension in an order of service stages. To be specific, the nodes of the service certificate linked list 1 are the third billing certificate, the third payment certificate, the third write-off certificate, and the third settlement certificate in succession. The service dimension corresponding to the service certificate linked list 1 is the serial number service dimension, and the service index corresponding to the service certificate linked list 1 is serial number 1234567. The service certificate linked list corresponding to the serial number dimension is the first-type service certificate linked list mentioned previously.

Pointer field 2 of the third payment certificate is filled with a linked list pointer of the second payment certificate corresponding to payment user 1, and the pointer field corresponding to payment user 1 in the second payment certificate is filled with a linked list pointer of the first payment certificate corresponding to payment user 1. The payment pointers corresponding to payment user 1 form a service certificate linked list 2 corresponding to payment user 1 in an order of payment occurrences. To be specific, the nodes of the service certificate linked list 2 are the first payment certificate, the second payment certificate, and the third payment certificate corresponding to payment user 1 in succession. The service dimension corresponding to the service certificate linked list 2 is the payment user dimension and the service index is an identifier of payment user 1. The service certificate linked list 2 is the second-type service certificate linked list mentioned previously.

The previous service certificate linked list can be a one-way linked list, and the previous linked list pointer can be a hash pointer. The previous description is merely an example, and is not limited.

It can be seen from the previous description that, on the one hand, in the present specification, the blockchain is used to store service certificates of multiple service dimensions, so that accuracy of service source tracing can be improved by using the tamper-resistance feature of the data whose certificate has been stored on the blockchain. In addition, the service certificates can be described based on multiple service dimensions, so that source tracing services of multiple service dimensions can be provided for users, thereby effectively improving the richness of the source tracing services and satisfying the diverse demands of users.

In addition, the service system further maintains the mapping relationship between the last node of each service certificate linked list and the service index of the service dimension that each service certificate linked list belongs to.

For example, assume that there are three service certificate linked lists: service certificate linked list 1, service certificate linked list 2, and service certificate linked list 3.

The service dimension corresponding to the service certificate linked list 1 is the service serial number, the service index of the service certificate linked list 1 is serial number 1234567, and the last node is the fourth node in the service certificate linked list 1.

The service dimension corresponding to the service certificate linked list 2 is the service serial number, the service index of the service certificate linked list 2 is serial number 1314288, and the last node is the third node in the service certificate linked list 1.

The service dimension corresponding to the service certificate linked list 3 is a payment user, the service index of the service certificate linked list 3 is an identifier of payment user 1, and the last node is the third node in the service certificate linked list 1.

The mapping relationships maintained by the service system are shown in Table 1.

TABLE 1

| Last node of service certificate linked list | Service index of service dimension that service certificate linked list belongs to |
| --- | --- |
| Third node in the service certificate linked list 1 | Service serial number 1234567 |
| Third node in the service certificate linked list 2 | Service serial number 1314288 |
| Third node in the service certificate linked list 3 | Identifier of payment user 1 |

It is worthwhile to note that, the last node in the mapping relationship maintained by the service system can be a service certificate corresponding to the last node of a service certificate linked list, or can be a hash pointer to the last node of the service certificate linked list. The previous description is merely an example, and is not limited.

By locally maintaining the mapping relationship between the last node of each linked list and the service index of the service dimension that each service certificate linked list belongs to, the service system can identify, on the blockchain based on the last node, a service certificate corresponding to each node of the service certificate linked list that includes the last node, thereby implementing service source tracing and improving efficiency of service source tracing.

Figure 3:
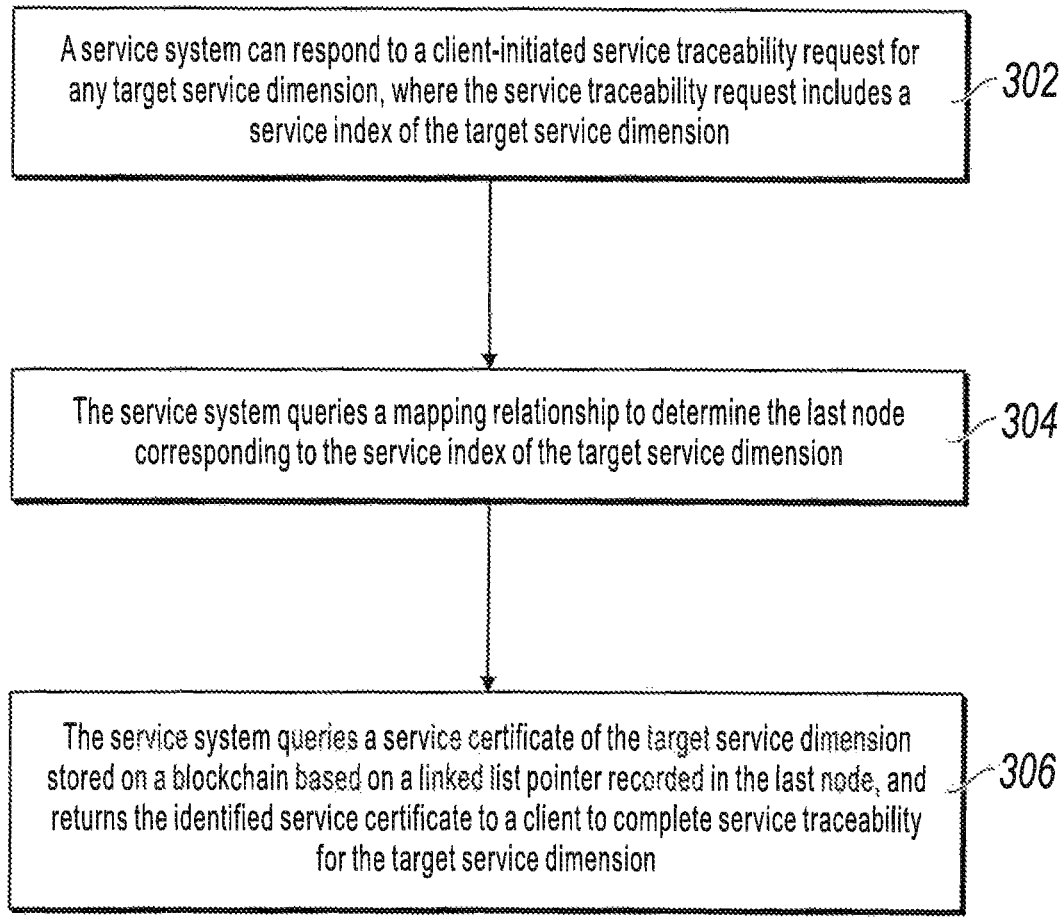
FIG. 3 is a flowchart illustrating a blockchain-based service source tracing method, according to an example implementation of the present specification.

FIG. 3 is a flowchart illustrating a blockchain-based service source tracing method, according to an example implementation of the present specification. The method can be applied to a service system and can include the following steps.

Step 302: The service system can respond to a client-initiated service source tracing request for any target service dimension, where the service source tracing request includes a service index of the target service dimension.

Step 304: The service system queries the mapping relationship to determine the last node corresponding to the service index of the target service dimension.

During implementation, after detecting a service source tracing initiation operation of a user for a target service dimension, the client can initiate a service source tracing request for the target service dimension to the service system. The service source tracing request includes a service index of the target service dimension.

In response to the client-initiated service source tracing request for the target service dimension, the service system can determine the last node corresponding to the service index of the target service dimension in the previously described mapping relationship maintained by the service system.

For example, the service index of the target service dimension included in the service source tracing request initiated by the client to the service system is serial number 1234567.

In response to the service source tracing request, the service system can query the last node corresponding to serial number 1234567 in the mapping relationship shown in Table 1. In the present example, the identified last node is the third node in the service certificate linked list 1.

Step 306: The service system queries a service certificate of the target service dimension stored on the blockchain based on a linked list pointer recorded in the last node, and returns the identified service certificate to the client to complete service source tracing for the target service dimension.

During implementation, when the last node maintained by the service system is the service certificate corresponding to the last node, the service system can identify, based on the pointer field corresponding to the service index of the target service dimension in the service certificate, a previous linked list node in the service certificate linked list that the last node belongs to, and then query the third-to-last (antepenultimate) linked list node in the service certificate linked list based on the pointer field corresponding to the service index of the target service dimension in the previous linked list node. By analogy, the service certificate corresponding to each linked list node in the service certificate linked list corresponding to the service index of the target service dimension is obtained, and the service certificate is returned to the client to complete service source tracing for the target service dimension.

When the last node maintained by the service system is a hash pointer to the last node, the service system can identify the last node based on the locally maintained hash pointer, and then identify, based on the pointer field corresponding to the service index of the target service dimension in the service certificate corresponding to the last node, a previous linked list node in the service certificate linked list that the last node belongs to, and then query the third-to-last linked list node in the service certificate linked list based on the pointer field corresponding to the service index of the target service dimension in the previous linked list node. By analogy, the service certificate corresponding to each linked list node in the service certificate linked list corresponding to the service index of the target service dimension is obtained, and the service certificate is returned to the client to complete service source tracing for the target service dimension.

The example in step 302 is used again. Assume that the last node identified by the service system is the third node in the service certificate linked list 1.

Assume that the first linked list node in the service certificate linked list 1 corresponds to the billing certificate, the second linked list node corresponds to the payment certificate, and the third linked list node corresponds to the write-off certificate.

The pointer field corresponding to service serial number 1234567 in the payment certificate is filled with the hash pointer to the billing certificate. The pointer field corresponding to service serial number 1234567 in the write-off certificate is filled with the hash pointer to the payment certificate.

When the last node maintained by the service system is the write-off certificate, the service system can identify the payment certificate in the blockchain based on the hash pointer that points to the payment certificate in the write-off certificate. Then, the service system identifies the billing certificate in the blockchain based on the hash pointer that points to the billing certificate in the payment certificate. The service system can return the identified billing certificate, payment certificate, and write-off certificate to the user, thereby implementing service source tracing for service serial number 1234567.

When the last node maintained by the service system is a hash pointer to the write-off certificate, the service system can query the write-off certificate in the blockchain based on the hash pointer, and identify the payment certificate in the blockchain based on the hash pointer that points to the payment certificate in the write-off certificate. Then, the service system identifies the billing certificate in the blockchain based on the hash pointer that points to the billing certificate in the payment certificate. The service system can return the identified billing certificate, payment certificate, and write-off certificate to the user, thereby implementing service source tracing for service serial number 1234567.

It can be seen from the previous description that, service certificates of multiple service dimensions stored on the blockchain form multiple service certificate linked lists, and the service system locally maintains the mapping relationship between the last node of each service certificate linked list and the service index of each service dimension, so that after receiving the service source tracing request for the target service dimension sent by the client, the service system can determine the last node corresponding to a target service index in the mapping relationship based on the target service index in the service source tracing request, and identify, by using a linked list pointer in the last node, a service certificate corresponding to each node in a service certificate linked list that the last node belongs to, so as to complete the service source tracing for the target service dimension.

In addition, the present specification further provides a method for updating a mapping relationship maintained by a service system. In order not to update a mapping relationship repeatedly when a mapping relationship is updated, a service index in the mapping relationship is locked, so that the last node corresponding to the service index cannot be updated repeatedly. After the last node corresponding to the service index is updated, the service system can unlock the service index.

During implementation, the service system monitors the service certificate of the target service dimension stored on the blockchain.

When detecting that the blockchain stores a target service certificate of a newly added node in a target service certificate linked list corresponding to the target service dimension, the service system updates the service index of the target service dimension from an unlocked state to a locked state, and updates the last node of the maintained target service certificate linked list into the target service certificate.

After updating the last node of the maintained target service certificate linked list to the target service certificate, the service system updates the service certificate of the target service dimension from the locked state to the unlocked state. When the service index is in a locked state, the last node corresponding to the service index cannot be updated repeatedly.

For example, assume that the current service system maintains a mapping relationship 1 between a write-off certificate (the last node of the service certificate linked list corresponding to service serial number 1234567) and service serial number 1234567 (the service index).

When the service system detects that the settlement certificate corresponding to service serial number 1234567 stored on the blockchain is added as a new node to the service certificate linked list corresponding to service serial number 1234567, the service system can update service serial number 1234567 from the unlocked status to the locked status, and update the last node in the locally maintained mapping relationship 1 from the write-off certificate to the settlement certificate. After the last node is updated, serial number 1234567 is updated from the locked state to the unlocked state.

Figure 4:
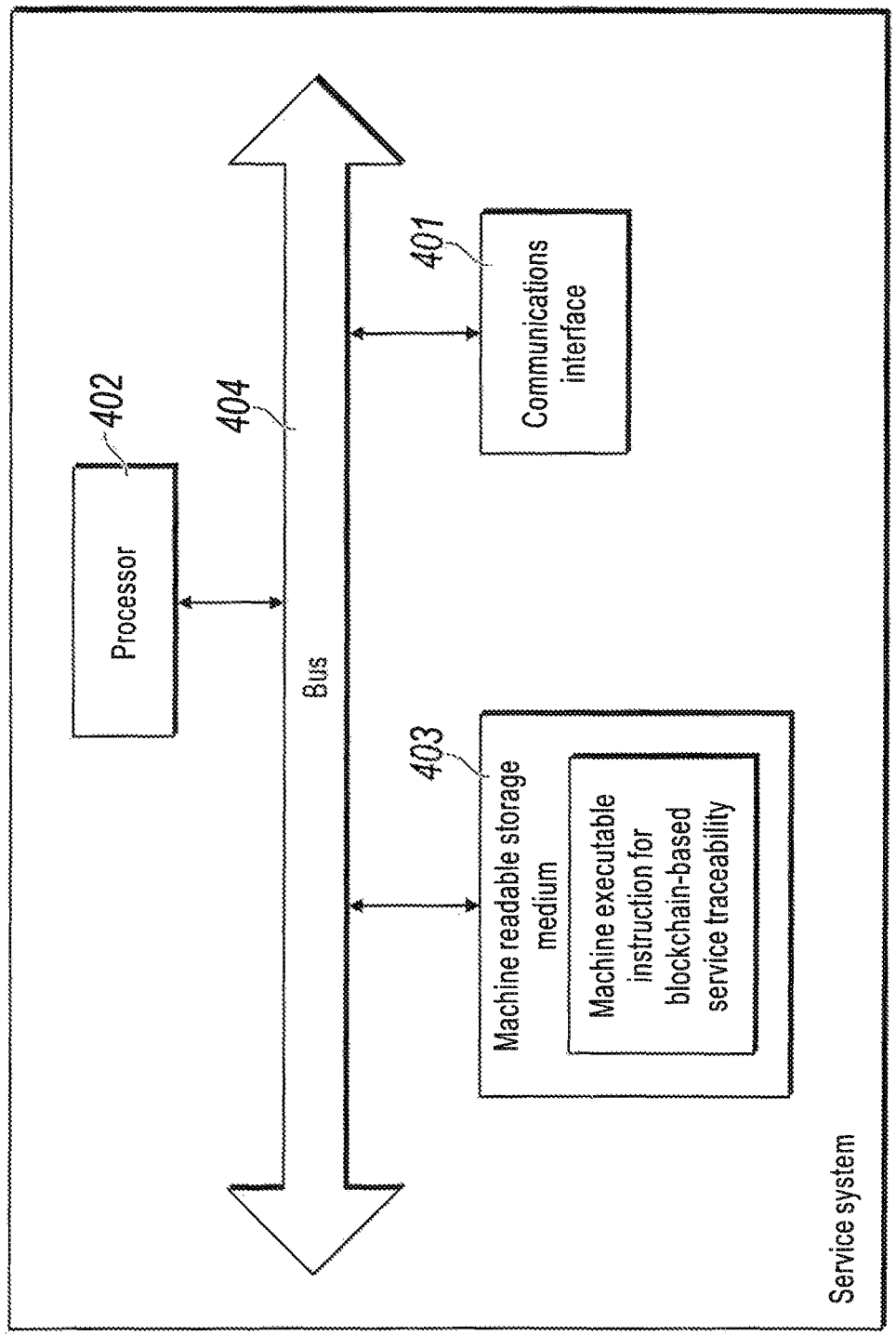
FIG. 4 is a diagram illustrating a hardware structure of an electronic device, according to an example implementation of the present specification.

Corresponding to the previous method implementation, the present specification further provides an implementation of a blockchain-based service source tracing apparatus. The implementation of the blockchain-based service source tracing apparatus in the present specification can be applied to an electronic device. The apparatus implementation can be implemented by software, or can be implemented by hardware or a combination of software and hardware. For example, the apparatus implementation is implemented by software. A logical apparatus is formed when a processor of an electronic device where the apparatus is located reads a corresponding computer program instruction in a non-volatile memory into the memory for running. In terms of hardware, FIG. 4 is a diagram of a hardware structure of an electronic device in which a block service configuration apparatus is located, according to the present specification. In addition to the processor, memory, network interface, and non-volatile memory shown in FIG. 4, the electronic device in which the apparatus is located in the implementation generally can further include other hardware based on an actual function of the electronic device. Details are omitted here for simplicity.

Figure 5:
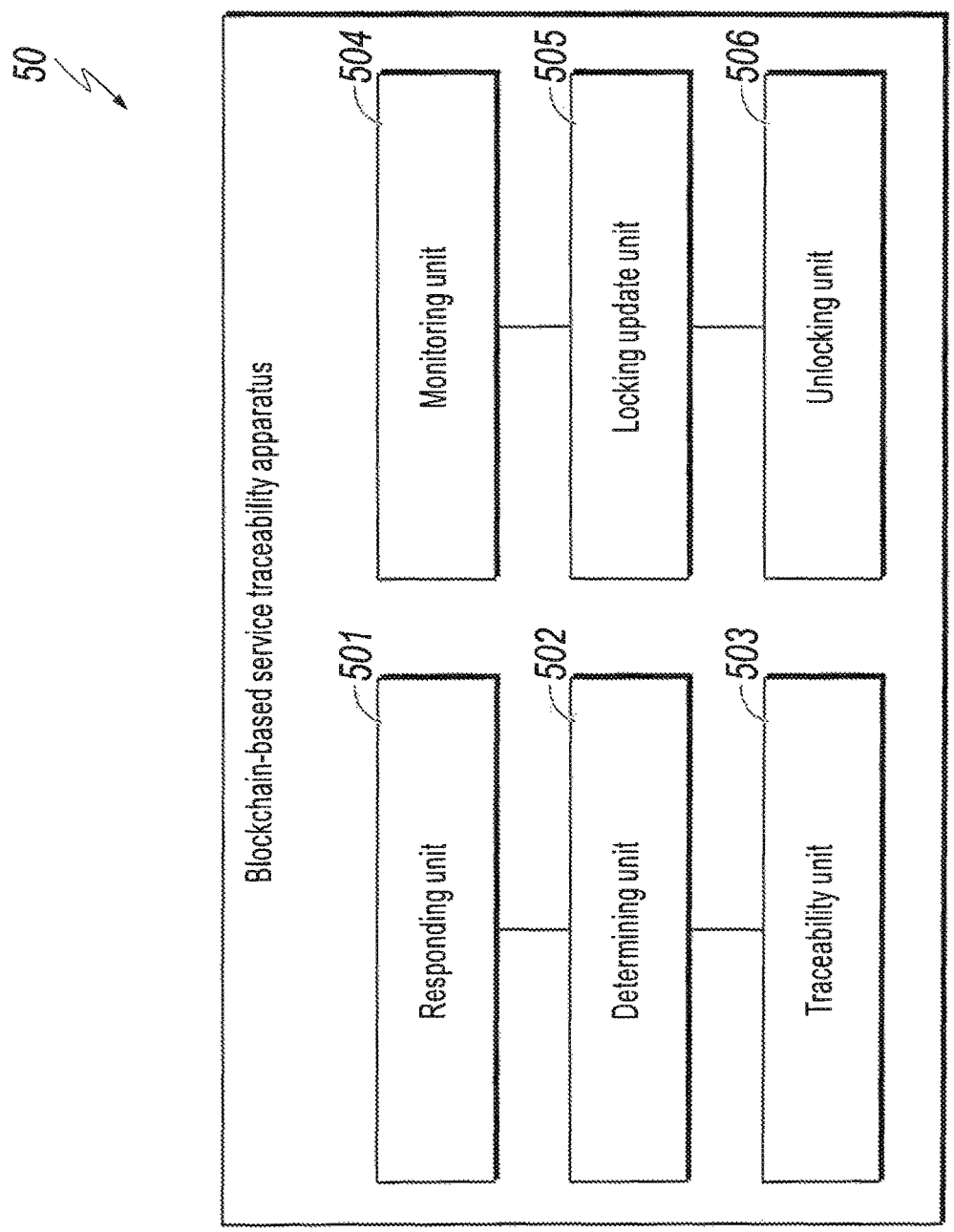
FIG. 5 is a block diagram illustrating a blockchain-based service source tracing apparatus, according to an example implementation of the present specification.

FIG. 5 is a block diagram illustrating a blockchain-based service source tracing apparatus, according to an example implementation of the present specification. The apparatus is applied to a service system; the blockchain stores service certificates of multiple service dimensions; the service certificates of the multiple service dimensions form multiple service certificate linked lists; and the service system maintains a mapping relationship between the last node of each service certificate linked list and a service index of a service dimension that each service certificate linked list belongs to.

The apparatus includes the following: a responding unit 501, configured to respond to a client-initiated service source tracing request for any target service dimension, where the service source tracing request includes a service index of the target service dimension; a determining unit 502, configured to query the mapping relationship to determine the last node corresponding to the service index of the target service dimension; and a source tracing unit 503, configured to query a service certificate of the target service dimension stored on the blockchain based on a linked list pointer recorded in the last node, and return the identified service certificate to the client to complete service source tracing for the target service dimension.

Optionally, the apparatus further includes the following: a monitoring unit 504, configured to monitor the service certificate of the target service dimension stored on the blockchain; a locking update unit 505, configured to: when it is detected that the blockchain stores a target service certificate of a newly added node in a target service certificate linked list corresponding to the target service dimension, update the service index of the target service dimension from an unlocked state to a locked state, and update the last node of the maintained target service certificate linked list into the target service certificate; and an unlocking unit 506, configured to: after the last node of the maintained target service certificate linked list is updated into the target service certificate, update the service certificate of the target service dimension from a locked state to an unlocked state.

Optionally, the service certificate includes multiple pointer fields, and the pointer fields correspond to different service dimensions respectively; and the pointer fields are used to fill linked list pointers, and the service certificates of the multiple service dimensions stored on the blockchain form multiple service certificate linked lists based on linked list pointers in the pointer fields of the service certificates.

Optionally, the linked list pointer is a hash pointer.

Optionally, the service certificate linked list is a one-way linked list.

Optionally, the service certificate linked list includes the following: a first-type service certificate linked list including service certificates of the same service at different service stages stored on the blockchain in an order of service stages; or a second-type service certificate linked list including service certificates of multiple services stored on the blockchain in an order of service occurrences.

Optionally, the first-type service certificate linked list is a linked list including a billing certificate, a payment certificate, a write-off certificate, and a settlement certificate of the same payment agency collection service in an order of service stages of the payment agency collection service.

Optionally, the second-type service certificate linked list includes any one of the following: multiple billing certificates in an order of billing occurrences; multiple payment certificates in an order of payment occurrences; multiple write-off certificates in an order of write-off occurrences; or multiple settlement certificates in an order of settlement occurrences.

Optionally, the blockchain includes a consortium blockchain including a payment institution and a payment platform; the service includes a payment agency collection service provided by the payment platform for the payment institution; and the service certificates include a payment bill, a payment certificate, a write-off certificate, a settlement certificate, and a refund certificate.

Corresponding to the previous method implementation, the present specification further provides an implementation of an electronic device. The electronic device includes the following: a processor; and a memory, configured to store a machine executable instruction, where the processor and the memory are usually interconnected by using an internal bus. In other possible implementations, the device can further include an external interface to communicate with other devices or components.

In the present implementation, by reading and executing a machine executable instruction that is stored in the memory and corresponds to control logic of blockchain-based service source tracing, the processor is enabled to perform the following operations: in response to a client-initiated service source tracing request for any target service dimension, where the service source tracing request includes a service index of the target service dimension; querying the maintained mapping relationship between the last node of each service certificate linked list and the service index of the service dimension that each service certificate linked list belongs to, to determine the last node corresponding to the service index of the target service dimension; and querying a service certificate of the target service dimension stored on the blockchain based on a linked list pointer recorded in the last node, and returning the identified service certificate to the client to complete service source tracing for the target service dimension, where the blockchain stores service certificates of multiple service dimensions, and the service certificates of the multiple service dimensions form multiple service certificate linked lists.

Optionally, by reading and executing a machine executable instruction that is stored in the memory and corresponds to control logic of blockchain-based service source tracing, the processor is enabled to perform the following operations: monitoring the service certificate of the target service dimension stored on the blockchain; when it is detected that the blockchain stores a target service certificate of a newly added node in a target service certificate linked list corresponding to the target service dimension, updating the service index of the target service dimension from an unlocked state to a locked state, and updating the last node of the maintained target service certificate linked list into the target service certificate; and after the last node of the maintained target service certificate linked list is updated into the target service certificate, updating the service certificate of the target service dimension from a locked state to an unlocked state.

Optionally, the service certificate includes multiple pointer fields, and the pointer fields correspond to different service dimensions respectively; and the pointer fields are used to fill linked list pointers, and the service certificates of the multiple service dimensions stored on the blockchain form multiple service certificate linked lists based on linked list pointers in the pointer fields of the service certificates.

Optionally, the linked list pointer is a hash pointer.

Optionally, the service certificate linked list is a one-way linked list.

Optionally, the service certificate linked list includes the following: a first-type service certificate linked list including service certificates of the same service at different service stages stored on the blockchain in an order of service stages; or a second-type service certificate linked list including service certificates of multiple services stored on the blockchain in an order of service occurrences.

Optionally, the first-type service certificate linked list is a linked list including a billing certificate, a payment certificate, a write-off certificate, and a settlement certificate of the same payment agency collection service in an order of service stages of the payment agency collection service.

Optionally, the second-type service certificate linked list includes any one of the following: multiple billing certificates in an order of billing occurrences; multiple payment certificates in an order of payment occurrences; multiple write-off certificates in an order of write-off occurrences; or multiple settlement certificates in an order of settlement occurrences.

Optionally, the blockchain includes a consortium blockchain including a payment institution and a payment platform; the service includes a payment agency collection service provided by the payment platform for the payment institution; and the service certificates include a payment bill, a payment certificate, a write-off certificate, a settlement certificate, and a refund certificate.

For an implementation process of functions and roles of each unit in the apparatus, references can be made to an implementation process of corresponding steps in the previous method. Details are omitted here for simplicity.

Because an apparatus implementation corresponds to a method implementation, for related parts, references can be made to related descriptions in the method implementation. The previously described apparatus implementation is merely an example. The units described as separate parts can or cannot be physically separate, and parts displayed as units can or cannot be physical units, can be located in one position, or can be distributed on multiple network units. Some or all of the modules can be selected depending on an actual demand to achieve the objectives of the solutions of the present specification. A person of ordinary skill in the art can understand and implement the implementations of the present specification without creative efforts.

The previous descriptions are merely example implementations of the present specification, but are not intended to limit the present specification. Any modification, equivalent replacement, or improvement made without departing from the spirit and principle of the present specification shall fall within the protection scope of the present specification.

What is claimed is:

1. A computer-implemented method for blockchain-based service source tracing, comprising:

receiving, by a service system, a service source tracing request from a client for a target service dimension of a plurality of service dimensions, wherein service certificates of the plurality of service dimensions are stored on a blockchain, the service certificates of the plurality of service dimensions form a plurality of service certificate linked lists, and the service system maintains a mapping relationship between a last node of each of the plurality of service certificate linked lists and a corresponding service index of a service dimension that each of the plurality of service certificate linked lists belongs to, wherein the service source tracing request comprises a service index of the target service dimension;

in response to the service source tracing request, querying, by the service system, the mapping relationship to determine a last node corresponding to the service index of the target service dimension;

querying, by the service system, a service certificate of the target service dimension stored on the blockchain based on a linked list pointer recorded in the last node; and returning, by the service system, the service certificate of the target service dimension to the client, wherein the computer-implemented method further comprises:

monitoring the service certificate of the target service dimension stored on the blockchain;

in response to detecting that the blockchain stores a target service certificate of a newly added node in a target service certificate linked list corresponding to the target service dimension, updating the service index of the target service dimension from an unlocked state to a locked state, and updating the last node of the target service certificate linked list into the target service certificate; and after the last node of the target service certificate linked list is updated into the target service certificate, updating the service certificate of the target service dimension from a locked state to an unlocked state.

2. The computer-implemented method according to claim 1, wherein:

the service certificate of the target service dimension comprises a plurality of pointer fields, and the plurality of pointer fields correspond to different service dimensions, respectively;

the plurality of pointer fields comprise linked list pointers; and the service certificates of the plurality of service dimensions stored on the blockchain form the plurality of service certificate linked lists based on the linked list pointers in the plurality of pointer fields of the service certificates.

3. The computer-implemented method according to claim 2, wherein at least one of the linked list pointers is a hash pointer.

4. The computer-implemented method according to claim 1, wherein at least one of the plurality of the service certificate linked lists is a one-way linked list.

5. The computer-implemented method according to claim 1, wherein at least one of the plurality of the service certificate linked lists comprises:

a first-type service certificate linked list comprising service certificates of a same service at different service stages stored on the blockchain in an order of service stages; or a second-type service certificate linked list comprising service certificates of plurality of services stored on the blockchain in an order of service occurrences.

6. The computer-implemented method according to claim 5, wherein the first-type service certificate linked list is a linked list comprising a billing certificate, a payment certificate, a write-off certificate, and a settlement certificate of a same payment agency collection service in an order of service stages of the same payment agency collection service.

7. The computer-implemented method according to claim 5, wherein the second-type service certificate linked list comprises one of:
a plurality of billing certificates in an order of billing occurrences;
a plurality of payment certificates in an order of payment occurrences;
a plurality of write-off certificates in an order of write-off occurrences; or
a plurality of settlement certificates in an order of settlement occurrences.

8. The computer-implemented method according to claim 1, wherein:
the blockchain comprises a consortium blockchain comprising a payment institution and a payment platform;
a service of the service system comprises a payment agency collection service provided by the payment platform for the payment institution; and
the service certificates comprise a payment bill, a payment certificate, a write-off certificate, a settlement certificate, and a refund certificate.

9. A non-transitory, computer-readable medium storing one or more instructions executable by a computer system to perform operations for blockchain-based service source tracing, comprising:
receiving, by a service system, a service source tracing request from a client for a target service dimension of a plurality of service dimensions, wherein service certificates of the plurality of service dimensions are stored on a blockchain, the service certificates of the plurality of service dimensions form a plurality of service certificate linked lists, and the service system maintains a mapping relationship between a last node of each of the plurality of service certificate linked lists and a corresponding service index of a service dimension that each of the plurality of service certificate linked lists belongs to, wherein the service source tracing request comprises a service index of the target service dimension;
in response to the service source tracing request, querying, by the service system, the mapping relationship to determine a last node corresponding to the service index of the target service dimension;
querying, by the service system, a service certificate of the target service dimension stored on the blockchain based on a linked list pointer recorded in the last node; and
returning, by the service system, the service certificate of the target service dimension to the client, wherein the operations further comprise:
monitoring the service certificate of the target service dimension stored on the blockchain;
in response to detecting that the blockchain stores a target service certificate of a newly added node in a target service certificate linked list corresponding to the target service dimension, updating the service index of the target service dimension from an unlocked state to a locked state, and updating the last node of the target service certificate linked list into the target service certificate; and after the last node of the target service certificate linked list is updated into the target service certificate, updating the service certificate of the target service dimension from a locked state to an unlocked state.

10. The non-transitory, computer-readable medium according to claim 9, wherein:
the service certificate of the target service dimension comprises a plurality of pointer fields, and the plurality of pointer fields correspond to different service dimensions, respectively;
the plurality of pointer fields comprise linked list pointers; and
the service certificates of the plurality of service dimensions stored on the blockchain form the plurality of service certificate linked lists based on the linked list pointers in the plurality of pointer fields of the service certificates.

11. The non-transitory, computer-readable medium according to claim 10, wherein at least one of the linked list pointers is a hash pointer.

12. The non-transitory, computer-readable medium according to claim 9, wherein at least one of the plurality of the service certificate linked lists is a one-way linked list.

13. The non-transitory, computer-readable medium according to claim 9, wherein at least one of the plurality of the service certificate linked lists comprises:
a first-type service certificate linked list comprising service certificates of a same service at different service stages stored on the blockchain in an order of service stages; or
a second-type service certificate linked list comprising service certificates of plurality of services stored on the blockchain in an order of service occurrences.

14. The non-transitory, computer-readable medium according to claim 9, wherein:
the blockchain comprises a consortium blockchain comprising a payment institution and a payment platform;
a service of the service system comprises a payment agency collection service provided by the payment platform for the payment institution; and
the service certificates comprise a payment bill, a payment certificate, a write-off certificate, a settlement certificate, and a refund certificate.

15. A computer-implemented system for blockchain-based service source tracing, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, by a service system, a service source tracing request from a client for a target service dimension of a plurality of service dimensions, wherein service certificates of the plurality of service dimensions are stored on a blockchain, the service certificates of the plurality of service dimensions form a plurality of service certificate linked lists, and the service system maintains a mapping relationship between a last node of each of the plurality of service certificate linked lists and a corresponding service index of a service dimension that each of the plurality of service certificate linked lists belongs to, wherein the service source tracing request comprises a service index of the target service dimension;

in response to the service source tracing request, querying, by the service system, the mapping relationship to determine a last node corresponding to the service index of the target service dimension;

querying, by the service system, a service certificate of the target service dimension stored on the blockchain based on a linked list pointer recorded in the last node; and returning, by the service system, the service certificate of the target service dimension to the client, wherein the operations further comprise:

monitoring the service certificate of the target service dimension stored on the blockchain;

in response to detecting that the blockchain stores a target service certificate of a newly added node in a target service certificate linked list corresponding to the target service dimension, updating the service index of the target service dimension from an unlocked state to a locked state, and updating the last node of the target service certificate linked list into the target service certificate; and after the last node of the target service certificate linked list is updated into the target service certificate, updating the service certificate of the target service dimension from a locked state to an unlocked state.

16. The computer-implemented system according to claim 15, wherein:

the service certificate of the target service dimension comprises a plurality of pointer fields, and the plurality of pointer fields correspond to different service dimensions, respectively;

the plurality of pointer fields comprise linked list pointers; and the service certificates of the plurality of service dimensions stored on the blockchain form the plurality of service certificate linked lists based on the linked list pointers in the plurality of pointer fields of the service certificates.

17. The computer-implemented system according to claim 15, wherein at least one of the plurality of the service certificate linked lists comprises:

a first-type service certificate linked list comprising service certificates of a same service at different service stages stored on the blockchain in an order of service stages; or a second-type service certificate linked list comprising service certificates of plurality of services stored on the blockchain in an order of service occurrences.

18. The computer-implemented system according to claim 17, wherein the second-type service certificate linked list comprises one of:

a plurality of billing certificates in an order of billing occurrences;

a plurality of payment certificates in an order of payment occurrences;

a plurality of write-off certificates in an order of write-off occurrences; or a plurality of settlement certificates in an order of settlement occurrences.

19. The computer-implemented system according to claim 15, wherein at least one of the plurality of the service certificate linked lists is a one-way linked list.

20. The computer-implemented system according to claim 15, wherein:

the blockchain comprises a consortium blockchain comprising a payment institution and a payment platform;

a service of the service system comprises a payment agency collection service provided by the payment platform for the payment institution; and the service certificates comprise a payment bill, a payment certificate, a write-off certificate, a settlement certificate, and a refund certificate.

* * * * *